(12) United States Patent
Shamir et al.

(10) Patent No.: US 8,692,783 B2
(45) Date of Patent: Apr. 8, 2014

(54) TOUCHSCREEN OVERLAY

(75) Inventors: Amos Shamir, New York, NY (US);
Gerald Rosengarten, New York, NY (US); Jay D. Schainholz, Cliffside Park, NJ (US)

(73) Assignee: 4 Thumbs, LLC, Southampton, NY (US)

( * ) Notice: Subject to any disclaimer, the term of this patent is extended or adjusted under 35 U.S.C. 154(b) by 450 days.

(21) Appl. No.: 12/827,038

(22) Filed: Jun. 30, 2010

(65) Prior Publication Data
US 2011/0157037 A1 Jun. 30, 2011

Related U.S. Application Data

(60) Provisional application No. 61/221,641, filed on Jun. 30, 2009.

(51) Int. Cl.
*G06F 3/041* (2006.01)
(52) U.S. Cl.
USPC .......................................................... 345/173

(58) Field of Classification Search
None
See application file for complete search history.

(56) References Cited

U.S. PATENT DOCUMENTS

| | | | |
|---|---|---|---|
| 5,914,702 A * | 6/1999 | Derocher et al. | 345/157 |
| 2002/0054030 A1 * | 5/2002 | Murphy | 345/173 |
| 2006/0176280 A1 * | 8/2006 | Griffin | 345/169 |
| 2009/0303680 A1 * | 12/2009 | Mihara et al. | 361/679.55 |
| 2010/0078343 A1 | 4/2010 | Hoellwarth et al. | |

* cited by examiner

*Primary Examiner* — Nicholas Lee
(74) *Attorney, Agent, or Firm* — Lerner, David, Littenberg, Krumholz & Mentlik, LLP

(57) ABSTRACT

An overlay for electronic devices having a touchscreen display includes a plurality of raised regions which, when the overlay is assembled to the touchscreen display, are at predetermined positions relative to the plurality of virtual keys on the touchscreen display. Alternatively, the overlay may include a plurality of recesses which, when the overlay is in assembled position on the touchscreen display, are in registry with the plurality of virtual keys on the touchscreen display.

6 Claims, 3 Drawing Sheets

TOUCHSCREEN OVERLAY

CROSS-REFERENCE TO RELATED APPLICATIONS

The present application claims the benefit of the filing date of U.S. Provisional Application No. 61/221,641, filed Jun. 30, 2009, the disclosure of which is hereby incorporated by reference herein.

FIELD OF THE INVENTION

The present invention is directed to touchscreen displays for electronic devices, and more particularly to overlays for touchscreen displays which enable users to identify different regions on the touchscreen display tactilely.

BACKGROUND OF THE INVENTION

Recently, there has been a substantial increase in the use of touchscreen displays in connection with electronic devices, such as portable telephones, personal digital assistants, computers, GPS navigation devices, etc. One particularly popular device incorporating a touchscreen display is the iPhone® cellular telephone available from Apple, Inc. of Cupertino, Calif. The iPhone® device and many other touchscreen devices do not have a conventional keypad with a plurality of physical keys representing different numbers, letters, commands and the like. Rather, such touchscreen devices have a flat pressure-sensitive screen in which the application of manual pressure to different portions of the screen represents different input signals. Thus, for example, in order to dial a telephone number on a touchscreen display, a virtual image of a numeric keypad will be shown on the display, and pressing the areas overlying a sequence of numbers will cause that number sequence to be input or "dialed." Similarly, for sending a text message, e-mail or other function requiring the input of letters, a virtual image of an alphanumeric keyboard will be displayed on the screen, and individual letters may be input by applying pressure in the areas overlying each letter. Still other applications may display a virtual input "button" or other indicia for inputting information. In order to continue with the application, the user may apply pressure to the touchscreen directly over one or more of these indicia.

Many consumers are reluctant to use touchscreen products because they prefer the tactile sensation of an actual keypad or other physically present buttons which may be pushed in order to input information into their electronic devices. For this reason, these consumers avoid devices incorporating touchscreens since they do not provide the tactile sensation that consumers are accustomed to.

There therefore exists a need for an apparatus which can provide the virtual keys, buttons or other indicia on touchscreen devices with the tactile feel of physical keys or buttons such that the user is able to tactilely locate the region on a touchscreen to be pressed.

SUMMARY OF THE INVENTION

The present invention addresses this need.

One embodiment of the present invention provides an overlay for an electronic device having a touchscreen display for displaying a plurality of virtual keys. The overlay includes a body; a plurality of raised regions projecting from the body at predetermined positions; and at least one fastener for removably fastening the body to the electronic device in a position overlying the touchscreen display so that the plurality of raised regions are at predetermined positions relative to the plurality of virtual keys on the touchscreen display. Each of the plurality of raised regions may have the same shape. Alternatively, a first portion of the plurality of raised regions may have a first shape, and a second portion of the plurality of raised regions may have a second shape different from the first shape. Moreover, the body may be transparent.

In preferred embodiments hereof, the fastener may be adapted to removably fasten the body to the electronic device so that each of the plurality of raised regions is in registry between ones of the plurality of virtual keys on the touchscreen display. In other preferred embodiments, the fastener may be adapted to removably fasten the body to the electronic device so that each of the plurality of raised regions overlies one of the plurality of virtual keys on the touchscreen display.

In still further preferred embodiments, the body may include a generally flat panel having a pair of side edges, a pair of side walls projecting substantially orthogonally from the side edges, a first return wall projecting from one of the side walls toward another of the side walls at a spaced distance from the panel, and a second return wall projecting from the another of the side walls toward the one of the side walls at a spaced distance from the panel, the first return wall being spaced from the second return wall, the panel, the pair of side walls, the first return wall and the second return wall collectively defining a substantially rectangular space for receiving the electronic device.

Another embodiment of the present invention provides an overlay assembly for an electronic device having a touchscreen display for displaying a plurality of virtual keys. The overlay assembly includes a body, the body having a first end and a second end, at least one tab extending from the first end and at least one tab extending from the second end; and a plurality of raised regions projecting from the body at predetermined positions. A first sleeve is adapted for assembly to the electronic device adjacent one end of the touchscreen display, the first sleeve having at least one region for receiving the at least one tab extending from the first end of the body. A second sleeve is adapted for assembly to the electronic device adjacent another end of the touchscreen display, the second sleeve having at least one region for receiving the at least one tab extending from the second end of the body.

In preferred embodiments hereof, the first and second sleeves may be adapted to removably fasten the body to the electronic device so that each of the plurality of raised regions is in registry between ones of the plurality of virtual keys on the touchscreen display. In other preferred embodiments, the first and second sleeves may be adapted to removably fasten the body to the electronic device so that each of the plurality of raised regions overlies one of the plurality of virtual keys on the touchscreen display.

A still further embodiment of the present invention provides an overlay for an electronic device having a touchscreen display for displaying a plurality of virtual keys. The overlay includes a body; a plurality of recessed regions formed in the body at predetermined positions; and at least one fastener for removably fastening the body to the electronic device in a position overlying the touchscreen display so that each of the plurality of recessed regions overlies one of the plurality of virtual keys on the touchscreen display.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION

The present invention provides an overlay which may be removably assembled to an electronic device in a position overlying the touchscreen of the device. The overlay includes at least one raised region which, with the overlay in assembled relationship on the electronic device, is in a position overlying an indicia on the touchscreen so as to provide a tactile indication of the area of the touchscreen to be pressed in order to input information represented by the indicia. Preferably, the overlay will include a plurality of raised regions, each corresponding to a different indicia displayed on the touchscreen.

Overlays according to the present invention may be formed from a thin polymer sheet with raised regions formed by embossing, vacuum forming, hot pressing or other technique. Polycarbonate sheets having a thickness of about 0.010 inches are preferred for forming the overlays. Alternatively, the overlays may be made by injection molding a polymer to have one or more raised regions in the desired locations. Preferably, the overlays will be formed from a material that is transparent so that the information displayed on the touchscreen will be visible through the overlay. However, the overlay may also be formed from a translucent or opaque material where a particular application makes such material desirable. Overlays that are transparent in some regions and translucent or opaque in other regions are also contemplated herein. Other materials and other forming techniques will be readily apparent to those skilled in the art.

Figure 3:
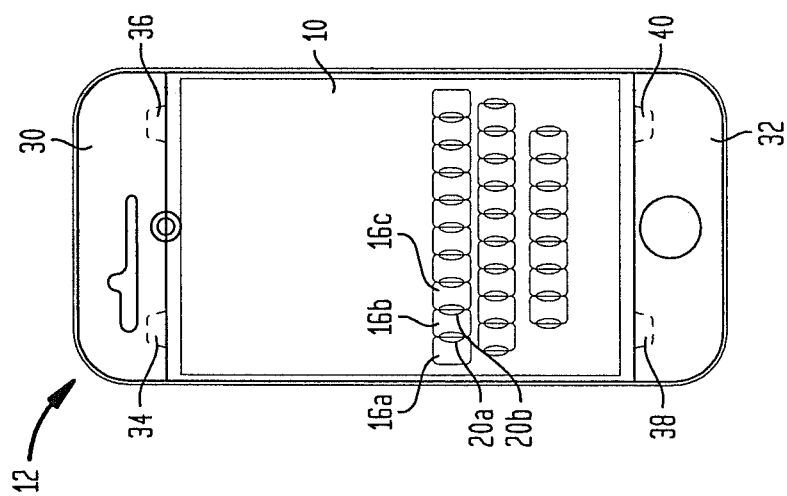
FIG. 3 is a plan view of the overlay of FIG. 1 in assembled relationship on the cell phone of FIG. 2.
Figure 2:
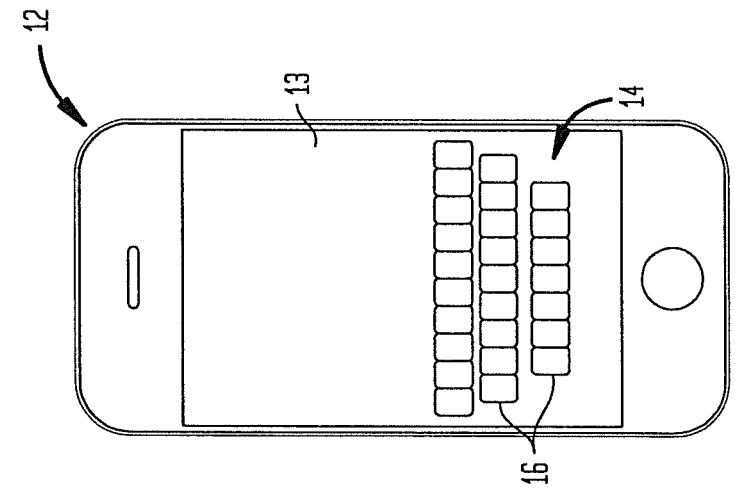
FIG. 2 is a plan view of a cell phone having a touchscreen display depicting a virtual keyboard in a vertical orientation.
Figure 1:
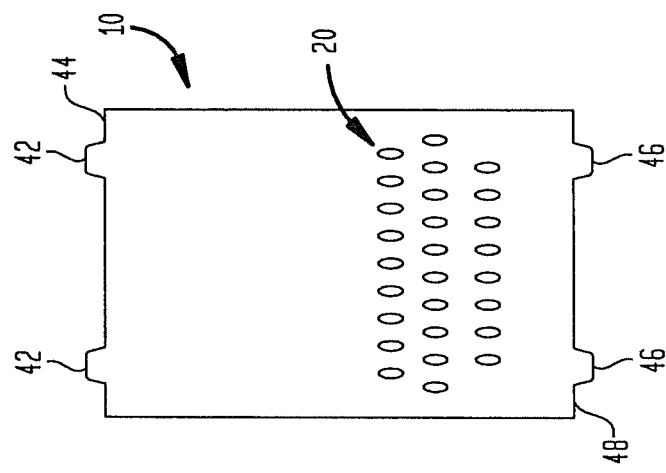
FIG. 1 is a plan view of an overlay according to a first embodiment of the present invention.

One embodiment of an overlay 10 according to the present invention and its method of use is shown in FIGS. 1-3 Overlay 10 is intended to be used in connection with a cellular telephone 12 having a touchscreen 13 on which a virtual alphanumeric keyboard 14 or other virtual keys or buttons are displayed in a vertical orientation. The keyboard display 14 includes a plurality of virtual keys 16, each of which represents a particular letter, number, symbol or other indicia. In order to actuate a specific "key," the user applies pressure to the touchscreen 13 in the region overlying that key.

Overlay 10 may be used to assist a user in locating each of the virtual keys on the face of touchscreen 13 and to assure that the proper region of the touchscreen is being pressed in order to actuate the desired key. In that regard, overlay 10 may include a plurality of raised regions or bumps 20 which, in the assembled position of overlay 10 to touchscreen 13, will overlie the spaces between adjacent virtual keys of the touchscreen display. For a keyboard or keypad having three rows of virtual keys, overlay 10 will be provided with three rows of raised bumps positioned to be in registry between each adjacent pair of virtual keys or on either side of each virtual key. That is, one bump 20a will overlie the space between virtual keys 16a and 16b; another bump 20b will overlie the space between virtual keys 16b and 16c; etc. In this way, a user will easily be able to identify the location of key 16a by recognizing it as the position just to the left of the first bump 20a in the top row of raised bumps 20. Similarly, the user will be able to identify the location of key 16b by recognizing it as the space between the first bump 20a and the second bump 20b in the top row of raised bumps on overlay 10. Hence, by feeling the plurality of raised bumps 20, the user is able to readily discern the locations of the individual virtual keys 16 of the touchscreen display. The user is then able to apply pressure to the touchscreen 13 in the areas overlying the virtual keys 16 in order to actuate the keys as desired. By placing the raised bumps 20 overlying the spaces between virtual keys 16, the overlay 10 will be in direct contact with touchscreen 13 in the areas directly over the virtual keys so that a user applying pressure to the overlay in those regions will actuate the underlying virtual keys. Alternatively, bumps 20 may be positioned directly over virtual keys where the application of pressure to a bump 20 will enable the underlying key to be actuated.

Although bumps 20 are shown in FIGS. 1 and 3 as all having substantially the same oblong shape, that need not be the case. Bumps 20 may have any shape desired, including round, square, rectangular, triangular, elliptical, star-shaped, etc. Moreover, all of bumps 20 need not have the same shape. For example, for a virtual display of a keyboard consisting of both numbers and letters, the bumps between the numbers may have a different shape than the bumps between the letters, thereby making it easier to differentiate between and locate these different indicia.

Overlay 10 may be attached to phone 12 in any number of ways which enable the overlay to be readily removed from the phone when not in use. In this regard, since the bumps 20 may interfere with some of the image displayed on touchscreen 13, it may be desirable to remove overlay 10 when a user desires to view and use the entirety of the touchscreen. Many configurations are available for removably securing overlay 10 to phone 12, as will be appreciated by those skilled in the art. One such configuration is shown in FIG. 3. In this configuration, cell phone 12 may be provided with a molded top holder 30 shaped as a closed sleeve and sized to snugly engage the top end of the phone, and with a molded bottom holder 32 shaped as a closed sleeve and sized to snugly engage the bottom end of the phone. Top holder 30 and bottom holder 32 may be held in assembled relationship on phone 12 by a snug, frictional engagement. Top holder 30 may include a pair of notches 34 and 36 formed in the upper surface thereof. Similarly, bottom holder 32 may include a pair of notches 38 and 40 formed in the upper surface thereof. Notches 34 and 36 are sized to receive a pair of spaced tabs 42 projecting from the top edge 44 of overlay 10. Similarly, notches 38 and 40 are sized to receive a pair of tabs 46 projecting from the bottom edge 48 of overlay 10. With tabs 42 inserted in notches 34 and 36, overlay 10 may be flexed to a curved configuration to insert tabs 46 into notches 38 and 40. Once overlay 10 is flattened against touchscreen 13, tabs 42 and 46 will hold the overlay securely against the surface of the touchscreen.

Many other configurations are available for removably securing overlay 10 to phone 12. For example, overlay 10 may be sized to cover the entire front face of phone 12, and may include a rearward projecting skirt (not shown) which may be snap-fit around the outer periphery of phone 12. Alternatively, overlay 10 may be in the form of a rectangular sheet held in place on touchscreen 13 by a weak releasable adhesive. In still other configurations, phone 12 may be manufactured with features intended to cooperate with features of the overlay to retain the overlay in assembled relationship thereto.

Figure 4:
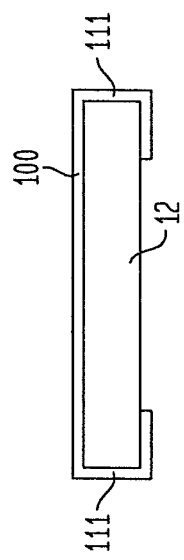
FIG. 4 is a top view of an overlay according to a second embodiment of the present invention in assembled relationship on the cell phone of FIG. 2.

In yet another configuration, the overlay may be formed as a sleeve which fully or partially encircles phone 12 at least in the region overlying touchscreen 13. An example of this can be seen in FIG. 4, which shows a top view of phone 12 having an overlay 100 covering the touchscreen of the phone and wrapping around the side edges and partially around the back surface of the phone. Overlay 100 may be assembled to phone 12 by sliding the overlay over an end of the phone until the desired position is reached. By making overlay 100 as only a partial sleeve, the side walls 111 of the overlay are able to flex away from one another as the overlay is assembled onto the phone, thereby facilitating the assembly process.

Figure 6:
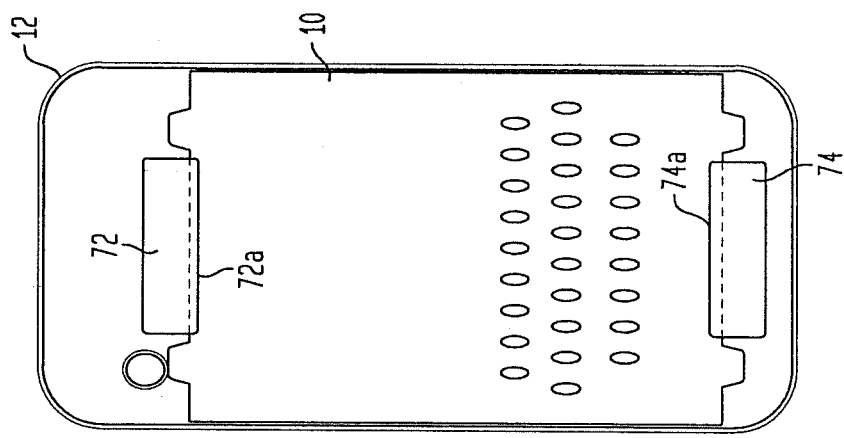
FIG. 6 is a plan view showing a storage position of the overlay of FIG. 1 on the cell phone back depicted in FIG. 5 when the overlay is not in use.
Figure 5:
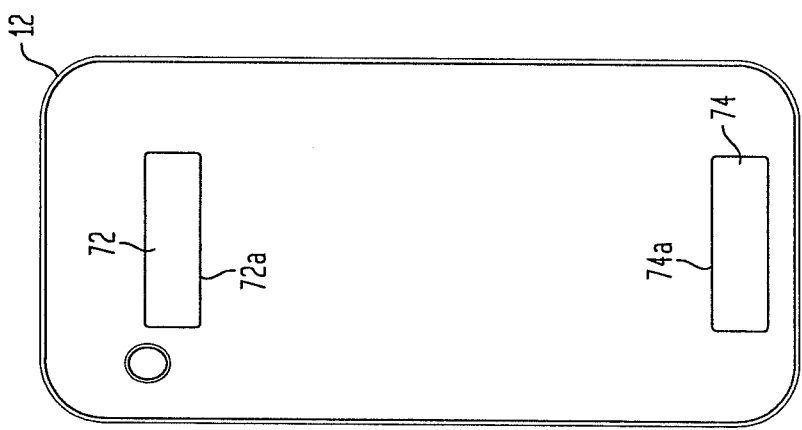
FIG. 5 is a back plan view of the cell phone of FIG. 2.

When the overlays of the present invention are not in use, they may be conveniently stored on the back side of phone 12 (e.g., the side of phone 12 opposite touchscreen 13.) Thus, referring to FIG. 5, a pair of tabs 72 and 74 may be spaced from one another on the back side of phone 12. Tab 72 may be secured to phone 12 so as to define an unsecured free edge 72a facing toward tab 74. Similarly, tab 74 may be secured to phone 12 so as to define an unsecured free edge 74a facing toward tab 72. When not in use, overlay 10 may be held in place against the back of phone 12 by tucking the ends of the overlay beneath free edges 72a and 74a, respectively, as shown in FIG. 6.

Similarly, when overlay 100 is not in use, it may simply be assembled to the phone in the reverse direction, i.e., with the embossed portion of the overlay overlying the back of the phone. In this position, the touchscreen 13 of the phone will not be covered by the overlay, but rather will be unobscured for both viewing and operating.

In a variant of overlay 10 described above, the overlay may be provided with a plurality of recesses in place of bumps 20. However, rather than overlying the spaces between adjacent virtual keys of the touchscreen display, this overlay would be designed such that the recesses lie directly over the virtual keys so that the recesses are in direct contact with the touchscreen in the areas directly over the virtual keys. The remainder of the overlay will be spaced from touchscreen 13. In this way, a user applying pressure to the recesses of the overlay will actuate the underlying virtual keys. As with bumps 20, the recesses may have any shape desired, including round, square, rectangular, triangular, elliptical, star-shaped, etc. Additionally, all of the recesses need not have the same shape, but may have different shapes depending upon the indicia or types of indicia which the recesses overlie.

Figure 7:
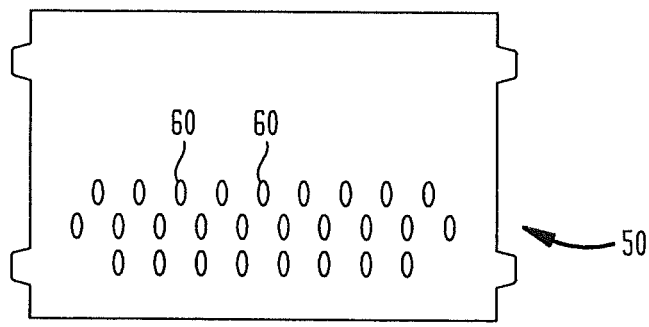
FIG. 7 is a plan view of an overlay according to a third embodiment of the present invention.
Figure 8:
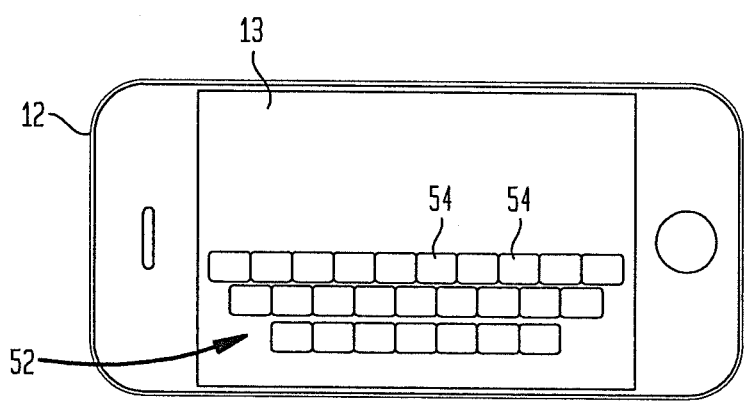
FIG. 8 is a plan view of a cell phone having a touchscreen display depicting a virtual keyboard in a horizontal orientation.
Figure 9:
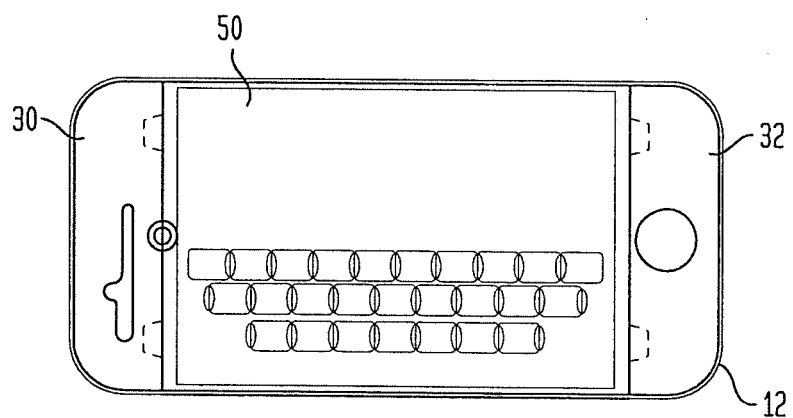
FIG. 9 is a plan view of the overlay of FIG. 7 in assembled relationship on the cell phone of FIG. 8.

An overlay 50 according to another embodiment of the present invention is shown in FIG. 7. Overlay 50 is also intended to be used in connection with cellular telephone 12 having touchscreen 13. However, in this case touchscreen 13 displays a virtual alphanumeric keyboard 52 or other virtual keys or buttons in a horizontal orientation. The keyboard display 52 includes a plurality of virtual keys 54, each of which represents a particular letter, number, symbol or other indicia. By applying pressure to touchscreen 13 in the region overlying a specific "key," the user may actuate that key to input data associated with the key.

Overlay 50 may include a plurality of raised regions or bumps 60 which, in the assembled position of overlay 50 to touchscreen 13, will overlie the spaces between adjacent virtual keys of the touchscreen display. Other than the orientation of the rows of bumps 60, overlay 50 is substantially the same as overlay 10 described above. It therefore will be appreciated that overlay 50 may be attached to phone 12 using the same variety of techniques discussed above for removably connecting overlays 10 and 100 to phone 12, including top and bottom holders 30 and 32, respectively, and that bumps 60 may have any shape or any combination of shapes desired. It will further be appreciated that overlay may be formed with a plurality of recesses rather than bumps 60 as has been described above.

There are several design criteria which are common to the overlays produced in accordance with the present invention. These criteria include the following:

1. The overlay should not materially change the shape, weight, appearance and other intended uses of the device with which it is used. However, the color, texture, appearance and other features of the overlay may be selected in order to add to the appeal of the electronic product.

2. The overlay should be virtually invisible when in assembled position over the touchscreen of the electronic device. However, there may be certain applications in which a translucent or even an opaque overlay is desirable.

3. The overlay should be capable of assembly to and removal from the electronic device numerous times as needed. However, for certain applications, it may be desirable that the overlay be a permanent fixture on the electronic device.

4. When assembled to the electronic device, the overlay may serve to protect the touchscreen of the device from dirt, scratches and other damage.

Overlays 10, 50 and 100 have been described above in connection with the actuation of virtual keys on a touchscreen display. This may be useful for inputting data, responding to inquiries, preparing e-mail messages, instant messaging, word processing and the like. In this regard, it should be noted that the overlays of the present invention provide added benefits in touch typing applications in which the overlays provide tactile aid without the need for visual cues.

In the foregoing, the overlays of the present invention have been described in connection with their use with a portable telephone 12 having a touchscreen display 13. It will be appreciated, however, that the overlays of the present invention may be used in connection with any electronic device having a touchscreen display, including personal digital assistants, computers, GPS navigation devices, television and video displays, instrumentation and the like.

While overlays 10, 50 and 100 have been described as having a plurality of bumps 20 and 60, respectively, the overlays of the present invention may be provided with any number of bumps as desired, and with as few as a single bump where the application dictates. That is, where a particular application performed using an electronic device having a touchscreen display requires actuation of only a single virtual key or button for inputting data, an overlay having only a single bump 20 or 60 overlying the virtual key or button, or a pair of bumps on either side of the virtual key or button, will enable the user to readily identify the region of the touchscreen display to be pressed in order to actuate the virtual key or button.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. An overlay for an electronic device having a touchscreen display for displaying a plurality of virtual keys, the overlay comprising:
 a body;
 a plurality of raised regions projecting from the body at predetermined positions; and
 at least one fastener for removably fastening the body to the electronic device in a position overlying the touchscreen display so that each of the plurality of raised regions is in registry between adjacent ones of the plurality of virtual keys on the touchscreen display.

2. The overlay as claimed in claim 1, wherein each of the plurality of raised regions has the same shape.

3. The overlay as claimed in claim 1, wherein a first portion of the plurality of raised regions has a first shape, and a second portion of the plurality of raised regions has a second shape different from the first shape.

4. The overlay as claimed in claim 1, wherein the at least one fastener includes a plurality of tabs for use in removably fastening the body to the electronic device.

5. The overlay as claimed in claim 1, wherein the body includes a generally flat panel having a pair of side edges, a pair of side walls projecting substantially orthogonally from the side edges, a first return wall projecting from one of the side walls toward another of the side walls at a spaced distance from the panel, and a second return wall projecting from the another of the side walls toward the one of the side walls at a spaced distance from the panel, the first return wall being spaced from the second return wall, the panel, the pair of side walls, the first return wall and the second return wall collectively defining a substantially rectangular space for receiving the electronic device.

6. The overlay as claimed in claim 1, wherein the body is transparent.

* * * * *